United States Patent [19]

Metz et al.

[11] 4,352,764
[45] Oct. 5, 1982

[54] METHOD OF MAKING SLAG SAND AND SLAG WOOL

[75] Inventors: Paul Metz, Luxembourg; Robert Schockmel, Esch; Roland Mersch, Dudelange, all of Luxembourg

[73] Assignee: Arbed S.A., Luxembourg, Luxembourg

[21] Appl. No.: 162,361

[22] Filed: Jun. 24, 1980

Related U.S. Application Data

[63] Continuation of Ser. No. 944,848, Sep. 22, 1978, abandoned.

[30] Foreign Application Priority Data

Sep. 26, 1977 [LU] Luxembourg ............................ 78185

[51] Int. Cl.³ .............................................. B01J 2/02
[52] U.S. Cl. ......................................................... 264/8
[58] Field of Search ............................................. 264/8

[56] References Cited

U.S. PATENT DOCUMENTS 4,115,089 9/1978 Metz et al. ............................... 264/8
4,153,655 5/1979 Minnick et al. ......................... 264/8

Primary Examiner—James R. Hall
Attorney, Agent, or Firm—Karl F. Ross

[57] ABSTRACT

Slag sand and slag wool are formed by a method wherein molten slag is poured at a temperature above 1300° C. in a thin flowing stream onto a vaned drum rotating at a peripheral speed of at least 25 m/sec. This drum, which may have forwardly directed nozzles for mixing the falling slag stream with a cooling medium such as water, breaks the slag up into droplets and projects these droplets through the air so they cool and form filaments and granules. The granules are collected separately from the filaments so that the installation simultaneously produces slag sand and slag wool.

3 Claims, 1 Drawing Figure

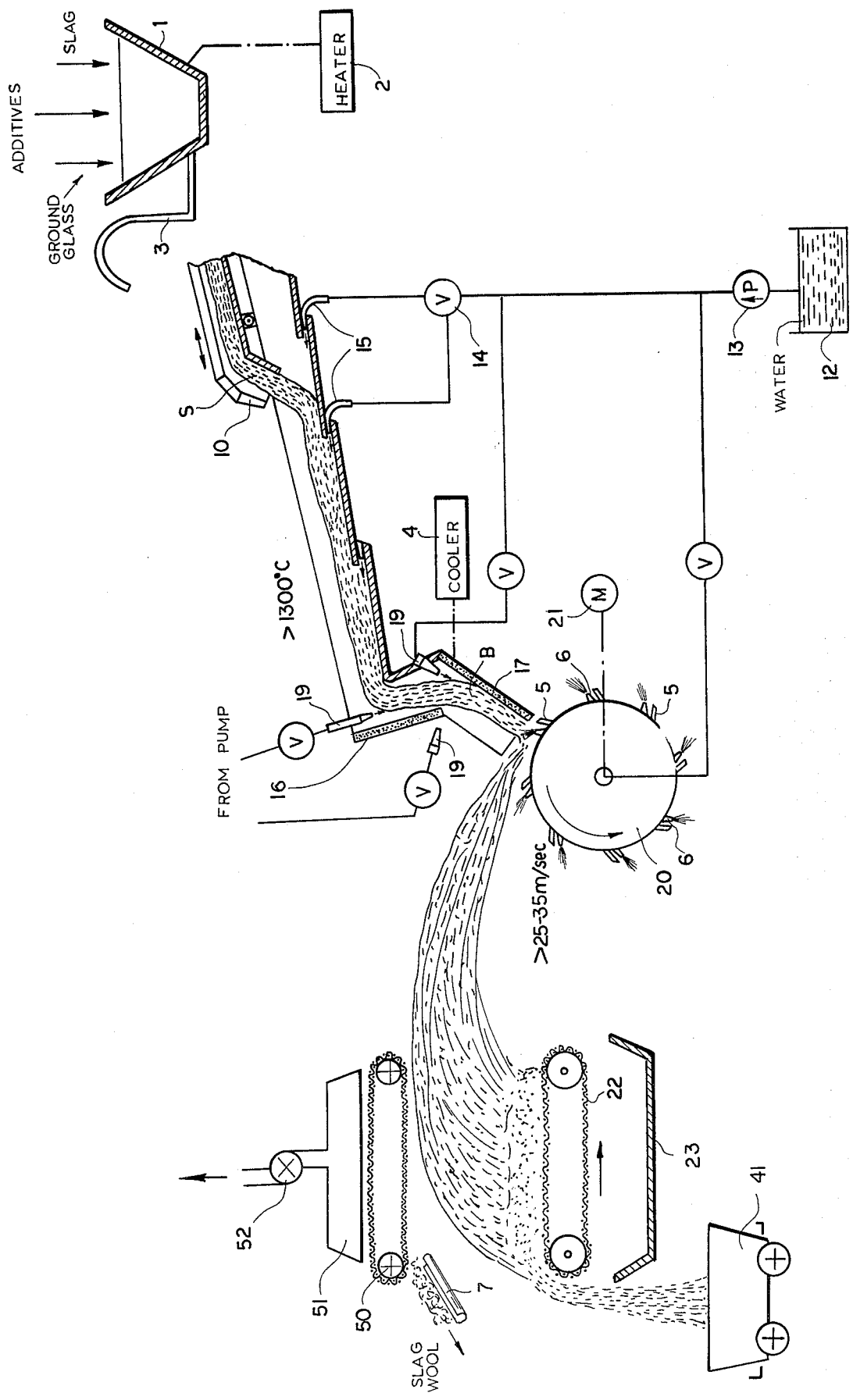

METHOD OF MAKING SLAG SAND AND SLAG WOOL

This application is a continuation of Ser. No. 944,848, filed Sept. 22, 1978, now abandoned.

FIELD OF THE INVENTION

The present invention relates to a method of treating metallurgical slag. More particularly this invention concerns a method of making mineral granules and wool from slag.

BACKGROUND OF THE INVENTION

Slag wool, that is mineral wool produced from blasst-furnace slag, is normally made by blowing a blast of air or steam through a stream of molten blast-furnace slag. The result is a filamentary product which has good insulating properties and which furthermore is relatively fireproof. Normally this material is manufactured as a by-product of smelting. Hardened slag is typically heated to render it molten, and is thereafter blown or spun into filaments.

The fusing of blast-furnace slag in an arc furnace, normally with acidic or basic additives, is a relatively expensive process. Considerable energy must be used to fuse the slag, and to produce the steam normally needed to blow it into filaments.

Commonly owned U.S. Pat. No. 4,171,965 describes a method of and apparatus for producing so-called slag sand wherein a stream of freely flowing slag of relatively low viscosity is passed down through a trough and is mixed with a limited quantity of water so that its viscosity is only slightly increased, with the slag remaining plastic and below the threshold of pyroplasticity. The thus cooled slag is then mixed with additional water to stiffen it somewhat further, while still leaving it plastic, and is then poured onto a rapidly rotating vaned drum that reduces it to fine particles that are projected through the air to a collection location.

In accordance with this U.S. Pat. No. 4,171,965 the cooling of the slag stream, which effectively freezes it into a glassy condition, takes place in a trough such as described in commonly owned U.S. Pat. No. 4,115,089, whose entire disclosure is herewith incorporated by reference as is the entire disclosure of U.S. Pat. No. 4,171,965. The residence time of the slag in this trough, which is between 2 m and 6 m long, is between 5 sec and 8 sec, and can be controlled by an arrangement such as described in commonly owned U.S. Pat. No. 4,123,247, whose entire disclosure is also herewith incorporated by reference. In accordance with this U.S. Pat. No. 4,123,247 water is added only in a quantity of between 0.5 $m^3$ and 0.7 $m^3$ of water per ton of slag, and only in the upstream third of the trough.

Therefore in U.S. Pat. No. 4,123,247 the slag, which is still above the pyroplastic threshold, is mixed with water so that a portion of it is cooled still below that threshold. To this end the slag is poured between a pair of upright horizontally spaced and inclined slot-forming plates while being mixed with water that is fed in at a rate of between 0.3 $m^3$ and 0.4 $m^3$ of water per ton of slag. The water used is the process water used to cool the blast furnace and has a temperature well above 40° C.

Thus in accordance with U.S. Pat. No. 4,171,965 it is possible to use an installation such as described in U.S. Pat. No. 4,115,089 but in an altogether different manner so as not to expand but merely to granulate the slag. The conversion of this system for granulation lies mainly in the manner in which the water is fed in, the amount of water fed in, and the speed at which the drum is rotating. Such conversion can be effected relatively easily in the known equipment.

The above-cited patent 4,171,965 describes an invention which, although parallel in certain manners to the other above-cited systems, can be used to produce slag granules which differ totally from the expanded slag produced by the other systems of U.S. Pat. Nos. 4,115,089 and 4,123,247. The progressive addition of small quantities of water does not produce expanded slag so that the resultant product has excellent hydraulic properties and does not have the crystalline structure that is so disadvantageous when using slag sand as, for example, in cement. This crystallization is normally caused by cooling the slag below a critical temperature with a large quantity of water relatively suddenly, that is by quenching. Such crystallization is a considerable problem in the production of slag sand. Indeed, the use of small quantities of water to produce slag sand with minimum crystallization as in accordance with the invention of U.S. Pat. No. 4,171,965 would normally seem to be impossible.

In the apparatus of that patent the drum is rotated at least 600 rpm and normally at approximately 100 rpm, so that if the drum is 50 cm in diameter it will have a peripheral speed of at least 94 meters/second. In the expanding operation described in the other U.S. Pat. Nos. 4,115,089 and 4,123,247 the drum normally rotates at a speed of between 250 rpm and 500 rpm, still having with the drum of 50 cm in diameter a peripheral speed of at least 40 meters/second. A water mist is sometimes generated between the drum and the collection location to increase the cooling.

In the normal slag granulation the slag sand usually is collected in a water-filled basin having at one end a drain. According to the invention of Patent 4,171,965 the slag sand is collected in foraminous substrate, on a conveyor belt formed as a screen such as described in Luxembourg patent applications 75,978 of Oct. 12, 1976 and 78,184 of Sept. 26, 1977, whose disclosures are also herewith incorporated by reference.

OBJECTS OF THE INVENTION

It is an object of the instant invention to improve on the methods described in the above-cited commonly owned patents.

Another object is to provide an improved method of treating metallurgical slag.

Yet another object is to provide an improved method of making slag wool.

SUMMARY OF THE INVENTION

These objects are attained according to the instant invention by forming a fused-slag stream directly as it comes from the blast furnace at a temperature of at least 1300° C. into a wide stream which is impinged on a vaned drum rotating at a peripheral speed of at least 25 m/sec—35 m/sec. This drum is provided with nozzles that eject a cooling fluid so that along with the simple projection of the material by the drum the wide slag stream is also projected by the coolant streams to pass to a collection location through the air. At the collection location in accordance with this invention the granules are collected separately from the slag wool produced.

According to further features of this invention the slag is mixed with liquid water and/or a gaseous cooling agent such as steam at a rate of 0.1–0.5 m³ per ton of slag. The cooling agent may be added by nozzles provided directly in the rotating drum, which nozzles also serve to project the slag into the air to the collection location. By the end of the process water at the rate of 0.7–1.2 m³ per ton of slag is used to completely solidify all of the slag.

According to further features of this invention particulate material is added to the slag before it is poured onto the rotating drum. In order to prevent the slag from cooling excessively it may be heated upstream of this drum.

With the method according to the instant invention it is therefore possible to recover high-quality slag wool without substantially increasing the cost of the installation for making granulate. Thus in a Thomas-process blast furnace having a height of 11 m and producing approximately 4000 tons per day of slag it will be possible to produce approximately 25,000 tons of slag wool per year assuming that 2% of this slag is converted into slag wool. Comparable production in a standard prior-art arrangement would require the use of two separate arc furnaces or the like having a capacity each of 12,500 tons per year. Obviously the saving in energy is enormous.

The metallurgical slag has or is mixed with additives to have a basicity (see page 339 of *The Making, Shaping and Treating of Steel*, United States Steel, 1971) of between 0.8 and 1.4 and a temperature of 1300° C.–1500° C. In the installation the critical temperature at which the slag starts to crystallize is never crossed prior to impingement of the slag on the drum, that is so long as the slag is in the feed trough or being formed into a wide stream.

The drum used in the method according to this invention is provided with outwardly directed nozzles. Approximately 0.1 m³ of water per ton of slag is added to the slag at the drum through the nozzles thereof. This water can be in the form of a liquid water and/or steam.

As mentioned above it is within the scope of this invention to mix additives with the slag prior to forming it into granulate and slag wool. If a considerable amount of additives is used it is sometimes necessary to heat the slag to prevent the critical temperature of crystallization from being crossed. In order to prevent the slag from becoming overly viscous it might be necessary to mix silicate additives to the slag. If the temperature is increased a more fluent slag is produced which will form a greater percentage of filaments and, therefore, slag wool. In order to raise the temperature it might be necessary to simply heat the slag by means of burners or electrically, or to add additives making an exothermal reaction such as silicon or aluminum compounds. When Thomas slag, also known as basic Bessemer slag, is being used it has been found advantageous to mix it with finely ground glass. As such an additive lowers the melting point, it can be advantageously employed with relatively cool slags to produce slag wool. The addition of a large quantity of additives may necessitate the use of a separate mixing vessel provided upstream of the steam-forming trough and connected thereto by means of a siphon. This vessel might have to be heated to prevent the slag from crystallizing prior to impingement on the drum. These additives may also be mixed with the gaseous or liquid cooling agent or medium injected into the slag in the band-forming trough or through the nozzles of the drum. These nozzles might also inject gas such as stack gasses which are aimed tangentially in the direction the drum throws the slag, so as to increase the formation of filaments and granules.

BRIEF DESCRIPTION OF THE DRAWING

The drawing is a largely schematic view of a system for carrying out the method according to the instant invention.

SPECIFIC DESCRIPTION

As shown in the drawing Thomas slag and additives such as ground glass are mixed in a vessel 1 which may be provided with a heater 2 to maintain the mixture above the crystallization temperature for it. Thence the mixture passes out through a siphon 3 to a first trough 10 where it forms an upstream stream S having a temperature above 1300° C. This stream S is brought into a trough 11 provided at its base with nozzles 15 through which water from a source 12 is pumped via a pump 13 and valves 14. The water is mixed with the slag of the stream S at a rate of 0.5 m³ of water per ton of slag, and may be in the form of cold or warm water or even steam.

Thence the stream S is poured onto the first of two stream-forming plates 16 and 17 at which are directed nozzles 19 to which is also supplied water under pressure to form the upstream stream S into a wide downstream stream B. A cooler 4 may be connected to cooling coils in these plates 16 and 17 to control the temperature of the stream B.

At the downstream outlet of the lowermost plate 17 the stream B is poured onto a drum 20 provided with a multiplicity of vanes 5. The drum 20 is rotated in the direction indicated by the arrow by means of a motor 21 at a peripheral speed greater than 25 m/sec–35 m/sec. Forwardly directed nozzles 6 on the drum inject a fluid cooling agent such as water or steam which may even be mixed with additives so that the stream B is projected through the air, being broken up into droplets and cooled by the cooling media issued from the nozzles 6. An injection rate of 0.1 m³ of water per ton of slag is used.

As the slag passes through the air it forms into filaments and granules. The granules are captured as slag sand on a foraminous belt 22 above a trough 23 and are dumped off into a cart 41. The filaments, instead, are sucked up by a blower 52 acting through a hood 51 and a foraminous belt 50. The belt 50 is advanced continuously to dump the slag wool off on a plate 7 whence it is conducted to a collection and packaging location.

The slag wool is extremely fine and is eminently suitable for use as insulation. The slag is very granular and is perfectly suited for use as an aggregate in concrete due to its good hydraulic properties and grindability.

We claim:

1. A method of simultaneously making slag sand and slag wool from metallurgical slag, said method comprising the steps of:
   (a) slag shaping a slag stream at a temperature of at least 1300° C. and above the temperature at which said slag crystallizes;
   (b) flowing said slag stream to a vaned drum before cooling of said slag stream to a temperature below that at which said slag crystallizes;

(c) rotating said vaned drum at a peripheral speed of at least 25 m/sec;

(d) impinging said slag stream prior to cooling thereof below said temperature at which said slag crystallizes onto the rotating drum and thereby breaking up said slag stream into droplets;

(e) cooling said droplets below said temperature at which said slag crystallizes to form said droplets into granules and filaments;

(f) projecting said granules and filaments by means of the rotating drum through the air to a collection location; and (g) separating and separately collecting said granules as slag sand and said filaments as slag wool at said location.

2. The method defined in claim 1, further comprising the step of adding particulate additives to said slag prior to shaping of same into said slag stream.

3. The method defined in claim 2 wherein said particulate additives include ground glass.

* * * * *